United States Patent
Antal, Sr.

(10) Patent No.: US 8,251,256 B2
(45) Date of Patent: *Aug. 28, 2012

(54) METHOD OF DISPENSING A METERED AMOUNT OF GRANULAR MATERIAL

(75) Inventor: Keith E. Antal, Sr., Valatie, NY (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/800,419

(22) Filed: May 13, 2010

(65) Prior Publication Data
US 2010/0224650 A1 Sep. 9, 2010

Related U.S. Application Data

(63) Continuation of application No. 11/810,992, filed on Jun. 7, 2007, now Pat. No. 7,819,347.

(60) Provisional application No. 60/811,987, filed on Jun. 8, 2006.

(51) Int. Cl.
*B67B 7/00* (2006.01)
*B67D 7/84* (2010.01)
*B65D 25/00* (2006.01)

(52) U.S. Cl. ............ 222/1; 222/456; 222/454; 222/441; 239/1; 239/689; 239/650; 239/652

(58) Field of Classification Search .............. 239/1, 650, 239/652, 689; 222/441, 454, 456, 1
See application file for complete search history.

(56) References Cited

U.S. PATENT DOCUMENTS

| | | | |
|---|---|---|---|
| 576,241 A | 2/1897 | Van Ame |
| 845,347 A | 2/1907 | Gesell |
| 903,548 A | 11/1908 | De Hayes |
| 913,027 A | 2/1909 | Menker |
| 934,493 A | 9/1909 | Wolkenstein |
| 1,618,688 A | 2/1927 | Tempest |
| 1,707,967 A | 4/1929 | Abbott |
| 1,727,799 A | 9/1929 | Abbott |
| 1,763,449 A | 6/1930 | Trautvetter |
| 1,877,808 A | 9/1932 | Cagliostro |
| 1,941,745 A | 1/1934 | Warren |
| 1,982,094 A | 11/1934 | Gessler |
| 2,136,805 A | 11/1938 | Scharinger |
| 2,604,235 A | 7/1952 | Teston |
| 2,644,616 A | 7/1953 | Gordon |

(Continued)

FOREIGN PATENT DOCUMENTS

EP 0 335 505 10/1989

(Continued)

*Primary Examiner* — Dinh Q Nguyen (74) *Attorney, Agent, or Firm* — Ryndak & Suri LLP (57) ABSTRACT

A method is provided for dispensing a controlled quantity of a granular material. The method employs a dispenser including a reservoir that retains granular material. The reservoir is supported in the dispenser with a passageway defined between opposing ends. The dispenser is first positioned in a loading orientation for the outflow of material from the reservoir through a nozzle to a metering cup. A baffle positioned proximate the opening of the metering cup stabilizes the controlled volume directed into the cup from the reservoir. Once the metering cup is filled, the dispenser is inverted. Then, the volume of material is directed from the cup through the passageway and out of an opening adjacent a diffuser, through which the material is spread.

24 Claims, 7 Drawing Sheets

U.S. PATENT DOCUMENTS

| | | |
|---|---|---|
| 2,704,623 A | 3/1955 | Yasso |
| 2,980,297 A | 4/1961 | Tucci |
| 3,323,683 A | 6/1967 | Cianciolo |
| 3,344,962 A | 10/1967 | Popivalo |
| 4,779,771 A | 10/1988 | Song |
| 4,828,149 A * | 5/1989 | Hester .................... 222/207 |
| 4,961,521 A | 10/1990 | Eckman |
| 5,169,049 A | 12/1992 | Krupic et al. |
| 5,346,105 A | 9/1994 | Onneweer |
| 5,454,487 A | 10/1995 | Vassilious |
| 5,467,903 A | 11/1995 | Sorensen et al. |
| 5,601,213 A | 2/1997 | Daniello |
| 5,711,463 A | 1/1998 | Chen et al. |
| 5,772,044 A * | 6/1998 | Euzen et al. .................... 209/236 |
| 6,269,983 B1 | 8/2001 | Jones et al. |
| 6,516,973 B2 | 2/2003 | Chrisman et al. |
| 7,143,909 B2 | 12/2006 | Peterson et al. |
| 7,819,347 B2 * | 10/2010 | Antal, Sr. .................... 239/689 |
| 2005/0258189 A1 | 11/2005 | Peterson et al. |

FOREIGN PATENT DOCUMENTS

| | | |
|---|---|---|
| GB | 2119285 | 11/1983 |

* cited by examiner

METHOD OF DISPENSING A METERED AMOUNT OF GRANULAR MATERIAL

CROSS-REFERENCE TO RELATED APPLICATIONS

This application is a continuation of U.S. patent application Ser. No. 11/810,992, filed on Jun. 7, 2007, pending, which claims priority to U.S. Provisional Patent Application No. 60/811,987, filed on Jun. 8, 2006. The entire disclosures of each of the foregoing applications are hereby expressly incorporated by reference.

FIELD OF THE INVENTION

The present invention relates to dispensers and methods of dispensing a predetermined amount of granular/particulate material, e.g., seasonings, colorants, concentrates, powdered mixtures, etc.

BACKGROUND OF THE INVENTION

Dispensers are commonly employed to add seasonings and flavorings to foods and/or beverages. Typically, seasonings such as table salt and ground pepper are dispensed from shakers comprising a single-chamber container or reservoir. The container typically includes an end cap comprising a plurality of apertures to allow the material to be dispensed upon inverting and agitating the shaker. The size and number of apertures will vary with the type of material to be dispensed. For example, a dispenser for table salt will typically have fewer apertures than, for example, a pepper dispenser inasmuch as the density and concentration of table salt is such that smaller quantities are desired (i.e., with each oscillation of the container.) Generally, a dedicated dispenser with the appropriately sized/numbered apertures will be employed for each material to control the dispensing rate. While the size and number of apertures can control the flow rate of material, the user must monitor other variables such as the length of time, number of oscillations, etc., to accurately control the quantity of dispensed material.

Many prior art dispensers address the need to deliver a controlled or preset amount of material by employing two or more chambers and a delivery tube. A first chamber forms a material reservoir while a second chamber is calibrated for measuring the material. The chambers are typically stacked, one above the other or in tandem. The delivery tube communicates with the measuring chamber at one end, extends through the reservoir, and at the opposite end communicates with the apertures of the dispenser. See, e.g., Abbott U.S. Pat. No. 1,707,967; Trautvetter U.S. Pat. No. 1,763,449; and Gordon U.S. Pat. No. 2,644,616.

Yet another metered material dispenser is disclosed in Jones et al. U.S. Pat. No. 6,269,983. Therein, a measuring cup is disposed in one end of the dispenser for receiving material when the dispenser is face-up, i.e., with the dispensing end facing upwardly. When the dispenser is inverted, material flows into a passageway defined by and between co-axial, cylindrical containers. Once in the passageway, the material flows downwardly and out of a dispensing end or diffuser. The configuration and spacing of the containers restricts dispensing of excess material, even when agitated. This Jones patent is commonly assigned with the present application and is herein incorporated by reference.

Eckman U.S. Pat. No. 4,961,521 discloses an adjustable metered dispenser useful for delivering seasonings such as salt and pepper. Eckman's dispenser comprises two chambers arranged in seriatim. The first chamber is a material reservoir and the second chamber is a measuring chamber. Eckman's dispenser exhibits an ability to close the metering chamber from the reservoir chamber when the material is dispensed. Thus, in order to avoid over-dispensing, the user must be sure that the passageway between the two chambers is closed.

Krupic U.S. Pat. No. 5,169,049 discloses a dispenser for seasonings, such as salt and pepper. The shaker comprises three chambers: a material reservoir chamber, a measuring chamber and a dispensing chamber. The reservoir chamber is disposed between the measuring chamber and the dispensing chamber while a delivery tube communicates with the measuring chamber and the dispensing chamber. When the dispenser is not in use, the measuring chamber faces downwardly. During use, the dispenser is inverted, and the dispensing chamber is filled with the material from the measuring chamber. The material must then be dispensed by shaking the dispenser in the inverted position to evacuate the material from the dispensing chamber via a plurality of apertures. In order to prevent over dispensing, one embodiment of the device includes shake-back guards within the reservoir chamber.

Peterson et al. U.S. Pat. No. 7,143,909 shows a dispenser capable of dispensing a variable quantity of a material or for dispensing a variety of different materials. This Peterson application is commonly assigned with the present application and is herein incorporated by reference.

BRIEF SUMMARY OF THE INVENTION

In accordance with one aspect of the present invention, a method is provided for delivering a controlled quantity of a granular material. The method includes providing a dispenser comprising a container assembly and a metering cup. The container assembly includes a reservoir containing granular material disposed within a container and a passageway is defined around the reservoir, leading to an opening in the container assembly. For example, the passageway may be defined between the reservoir and an outer enclosure. The reservoir may be removable for refilling or replacement with a filled reservoir. The metering cup is disposed in combination within the container assembly and has an open end adapted to receive material from the reservoir. When the container is positioned in a first or loading orientation, a controlled quantity of the granular material contained in the reservoir flows from the reservoir through a reservoir opening into the metering cup. A baffle is provided for stabilizing the quantity of material filled into the metering cup. In particular, the granular material collected in the metering cup engages the baffle once the controlled quantity of the material is filled into the metering cup. The material is then dispensed by positioning the container assembly in a second orientation, for example by inverting the container assembly about a generally horizontal axis, such that material flows out of the metering cup, into the passageway and out through the opening in the container assembly. Optionally, but preferably, the material then flows onto a diffuser to be spread as it is dispensed.

In one embodiment, the reservoir opening is provided in the form of a nozzle defined by the reservoir.

In another embodiment, the method includes providing the baffle with a baffle ring. The baffle ring is preferably positioned radially inwardly of the metering cup and adjacent the reservoir opening. More preferably, the baffle ring is positioned radially outwardly of the reservoir opening. Still more preferably, the baffle ring is axially spaced from the reservoir opening and coaxial with the reservoir opening and the metering cup. The baffle ring may be positioned within the metering cup. Preferably, the baffle is configured to engage a repose surface of the granular material which is formed as the material flows into the metering cup, the repose surface defining a repose angle. The controlled quantity of material may be determined by an internal geometry of the metering cup and the repose angle.

In another embodiment, the method includes providing the baffle with an angled baffle plate extending radially outwardly from the baffle ring and the metering cup, which may be parallel to an outer surface of the reservoir. An open area may be defined between the baffle and said outer reservoir surface, the open area leading to the passageway. One or more openings in the circumference of the baffle ring may lead into the open area, so that granular material that falls radially outside the baffle ring when the dispenser is inverted may be directed radially inwardly through the opening or openings and into the open area.

In still another embodiment, the method includes adjusting an axial spacing of the reservoir opening and the baffle from a base of the metering cup to adjust the controlled amount of granular material that will be dispensed. For example, the metering cup may be threaded onto the container assembly, and the axial spacing may be adjusted by rotating the metering cup relative to the container assembly.

BRIEF DESCRIPTION OF THE DRAWINGS

For the purpose of illustrating the invention, the drawings show forms of the invention that are presently preferred. However, it should be understood that this invention is not limited to the precise arrangements and instrumentalities shown in the drawings.

DETAILED DESCRIPTION OF THE DRAWINGS

Figure 1:
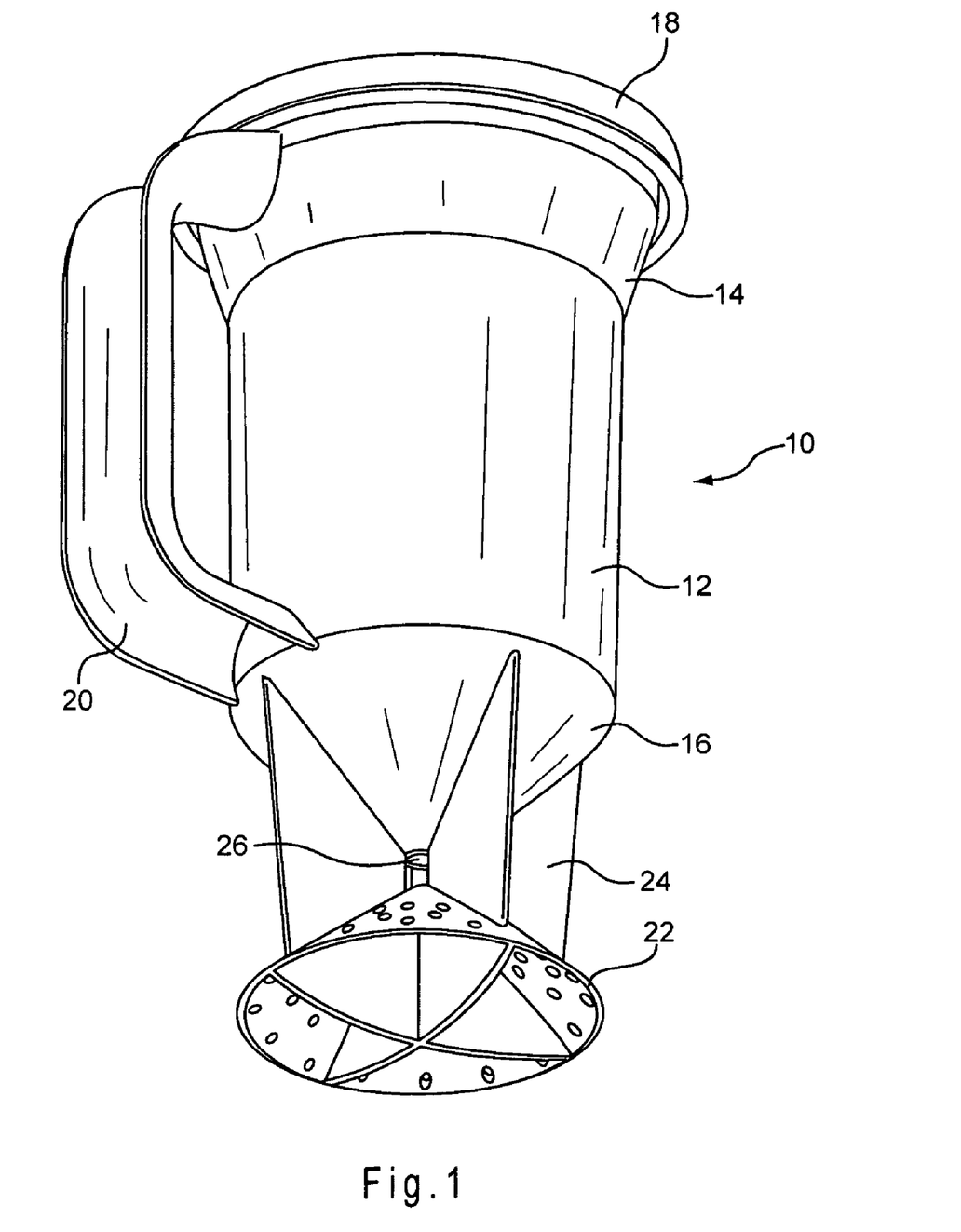
FIG. 1 is a perspective view of an embodiment of a dispenser according to the present invention as shown in a dispensing position.

Referring now to the drawings wherein like numerals indicate like elements, FIG. 1 depicts an exemplary embodiment of a dispenser 10 according to the present invention. Dispenser 10 is primarily used to dispense medium to coarse particulate material, such as salt, but may also be used to dispense fine or ultra-fine granular material, such as confection sugar, cinnamon or other such seasonings. Furthermore, while the teachings herein are described in the context of the food service/preparation industry, it will be appreciated that the teachings herein are applicable to measuring and dispensing any granular or particulate material. Examples include the measurement and delivery of particulate materials in the building industry, e.g., cements, stone dust, sand, or in the manufacturing industry, e.g., concentrate in plastics, colorants in wax, etc. As will become readily apparent from the following detailed description, dispenser 10 is multi-purpose and may be reconfigured to dispense variable quantities of material or dispensing a variety of different materials.

Dispenser 10 comprises a central, generally cylindrical container or enclosure 12, which is to be loaded or filled with a granular material (not shown in FIG. 1). At one end of container 12 is a flared end portion 14. At the opposite end of container 12 is a cone shaped collector 16. A cap 18 is provided on flared end 14 and a diffuser 22 is disposed at collector end 16 via ribs 24. Ribs 24 support diffuser 22 on the outside surface of collector 16. A collector opening 26 is formed in collector 16. As explained in more detail below, granular material falls from opening 26 and is diffused by diffuser 22 over a food product. A handle 20 is connected to container 12 for holding and manipulating dispenser 10 between the upward position and the inverted, dispensing position. Dispenser 10 is preferably comprised of a rigid material such as plastic, metal or glass. However, it may be comprised of flexible materials.

Figure 2:
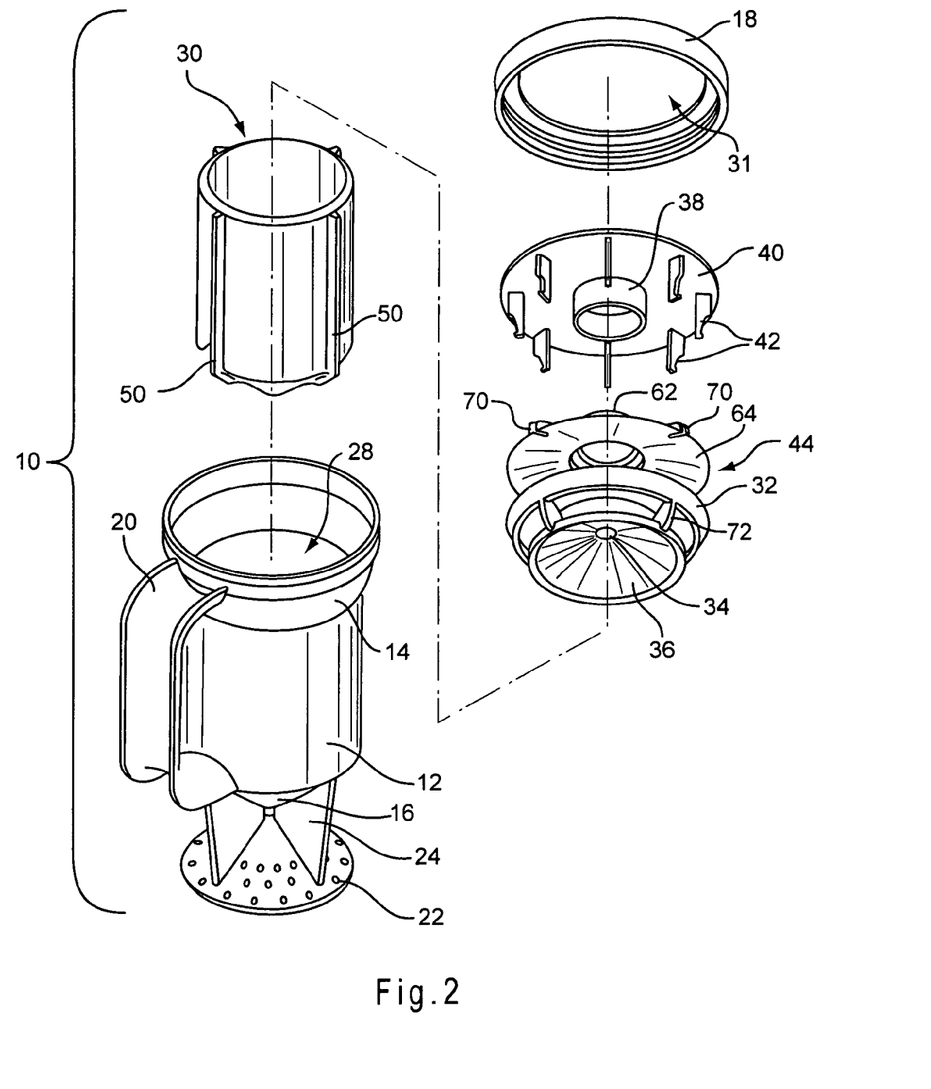
FIG. 2 is an exploded perspective view of the dispenser embodiment as shown in FIG. 1.
Figure 3:
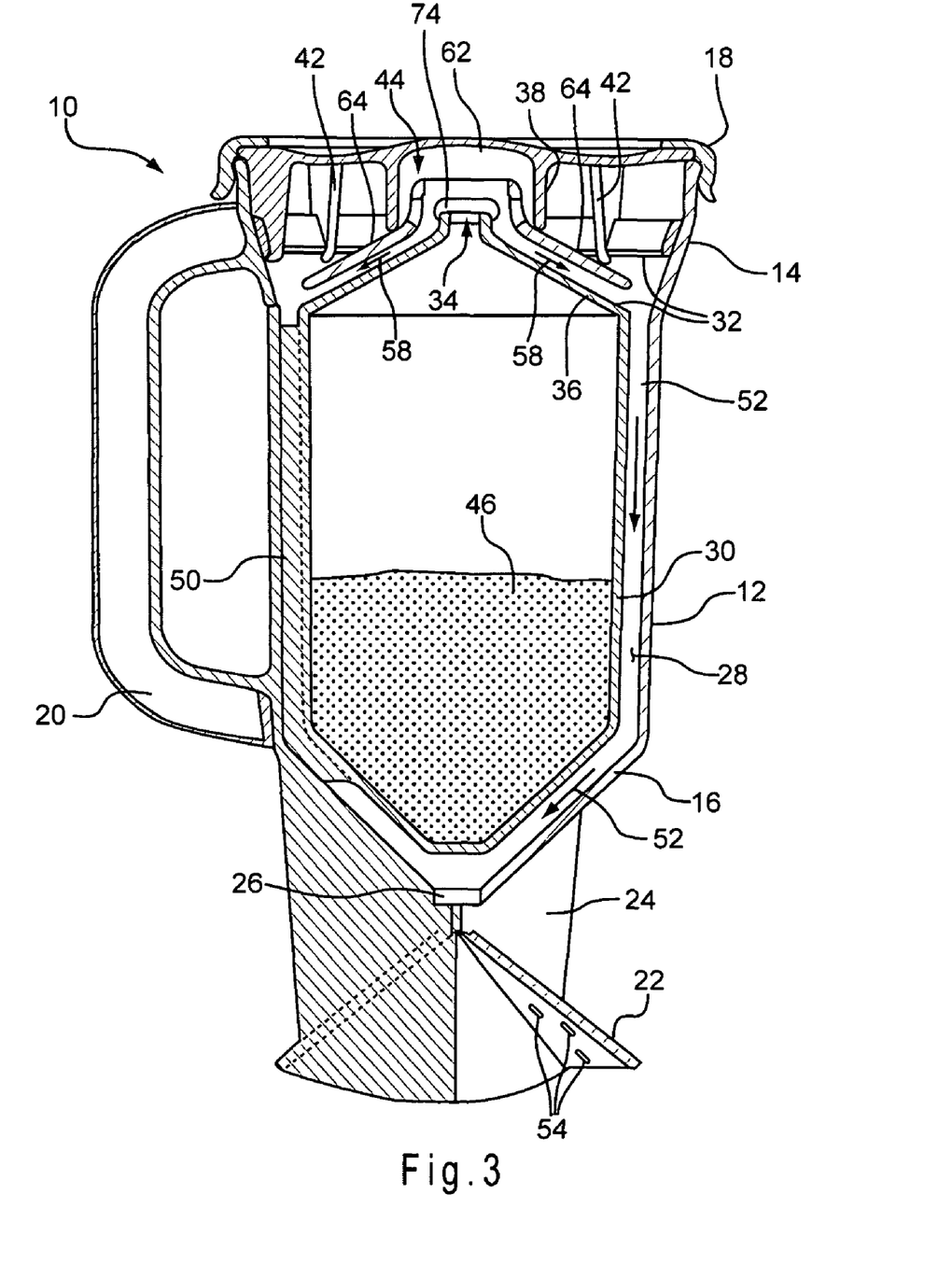
FIG. 3 is a cross sectional view of the dispenser embodiment as shown in FIGS. 1 and 2.

FIG. 2 is an exploded perspective view of the embodiment of the invention shown in FIG. 1. Container 12 defines an internal volume 28, which is accessible by removal of cap 18 from flared end 14 of dispenser 10. An inner reservoir 30 is positioned within internal volume 28. A plurality of fins 50 attached to or formed as part of the reservoir, position reservoir 30 within internal volume 28 of container 12. Reservoir 30 may be removable from container 12 when empty and replaced with a reservoir filled with a charge of material. As shown in FIG. 3, reservoir 30 defines an internal volume that retains the material to be dispensed by dispenser 10. Inner reservoir 30 includes a reservoir cap 32, which encloses one end of reservoir 30. A nozzle 34 is defined at the base of an angled surface 36 of cap 32. A metering cup 38 is provided on a wall portion 40 of cap 18. Cap 18 is generally circular and has an area 31 into which wall portion 40 snugly fits. Cap 18 and wall 40 may also be made as an integral unit.

Positioned between wall portion 40 of cap 18 and reservoir cap 32 is a baffle 44, which is discussed in greater detail below. Slots 70 formed in a baffle plate 64 engage tabs 42, projecting from wall portion 40. Slots 70 also engage reservoir ribs 72, which fixes the position of baffle plate 64. As illustrated, baffle 44 is removable. However, in another embodiment (not shown), the baffle is integrally formed with reservoir cap 32. An open area 58 (FIG. 3) is defined between baffle plate 64 and the angled surface on the outside of reservoir cap 32.

Referring now to the cross section of FIG. 3, there is shown the enclosure of container 12 having inner reservoir 30 positioned therein. The outside dimension of reservoir 30 is shown to be less than internal dimension 28 of container assembly 12 and defines a passageway 52 therebetween for directing granular material 46 from metering cup 38 to collector opening 26 for deposition onto diffuser 22. As shown in cross section in FIG. 3, fins 50 position reservoir 30 within internal volume 28 of container 12. Angled surface 36 is spaced from baffle plate 64 and defines open area 58 which feeds passageway 52.

As illustrated in FIG. 3, dispenser 10 is in an inverted dispensing position (i.e., a "second orientation"). Dispenser 10 normally sits on cap 18 with diffuser 22 projecting upwardly. In this first position or orientation, granular material 46 within reservoir 30, by the force of gravity, moves downwardly to angled surface 36 and a portion thereof passes through nozzle 34 into an open end of metering cup 38. (See FIG. 6.) Upon inverting dispenser 10 to the position shown in FIG. 3, the volume of material in metering cup 38 moves outside angled surface 36 into passageway 52, and across collector 16 to opening 26. Granular material 46 discharges in this inverted position from collector opening 26 and is diffused over the food product or the like by means of diffuser 22. Diffuser 22 may include a series of openings 54 to assist in the spread of material.

Baffle 44 is provided adjacent metering cup 38, nozzle 34 and reservoir 30. Baffle 44 is defined as a baffle ring 62 that projects from a baffle plate 64 into cup 38. Baffle ring 62 is spaced from the bottom 38b of cup 38 and has an outer diameter which is less than the inner diameter of cup 38. Nozzle 34 directs granular material 46 through the inside of baffle ring 62 into cup 38. As the material fills cup 38 (upon the dispenser being placed in the position shown in FIG. 6), granular material 46 contacts baffle ring 62 and is stabilized within cup 38.

Figure 7:
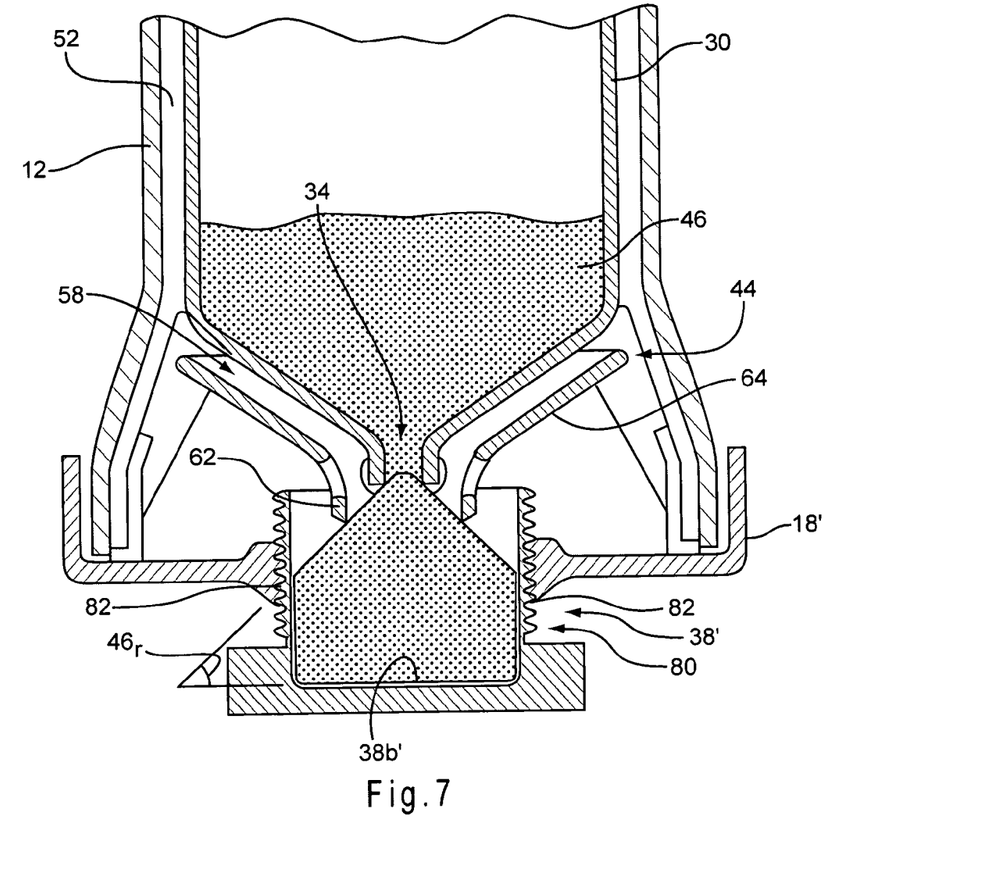
FIG. 7 is a partial cross sectional view of an alternate embodiment of the dispenser according to the present invention.

Baffle plate 64 extends radially outwardly from metering cup 38 and is contacted by the sidewall structure of metering cup 38 such that material within the metering cup is directed either through baffle ring 62 or through flow openings 74 in baffle plate 64. When the metering cup sidewall structure and baffle plate 64 are in contact, the outer circumferential edge of baffle plate 64 preferably contacts the inner surface of flared end portion 14 of container 12. (This contact is not shown in FIG. 3). This prevents material, which may remain in channel 52, from entering into the space above baffle plate 64 but outside metering cup 38 and possibly becoming lodged between baffle plate 64 and wall portion 40 of cap 18, which may happen when dispenser 10 is jostled and then turned from the second to the first orientation. When the sidewall structure of metering cup 38 does not contact baffle plate 64, for example, as shown in FIG. 7, baffle plate 64 preferably does not contact the inner wall of the container so that material that escapes between the sidewall structure of metering cup 38 and baffle plate 64 can flow into passageway 52.

Figure 4:
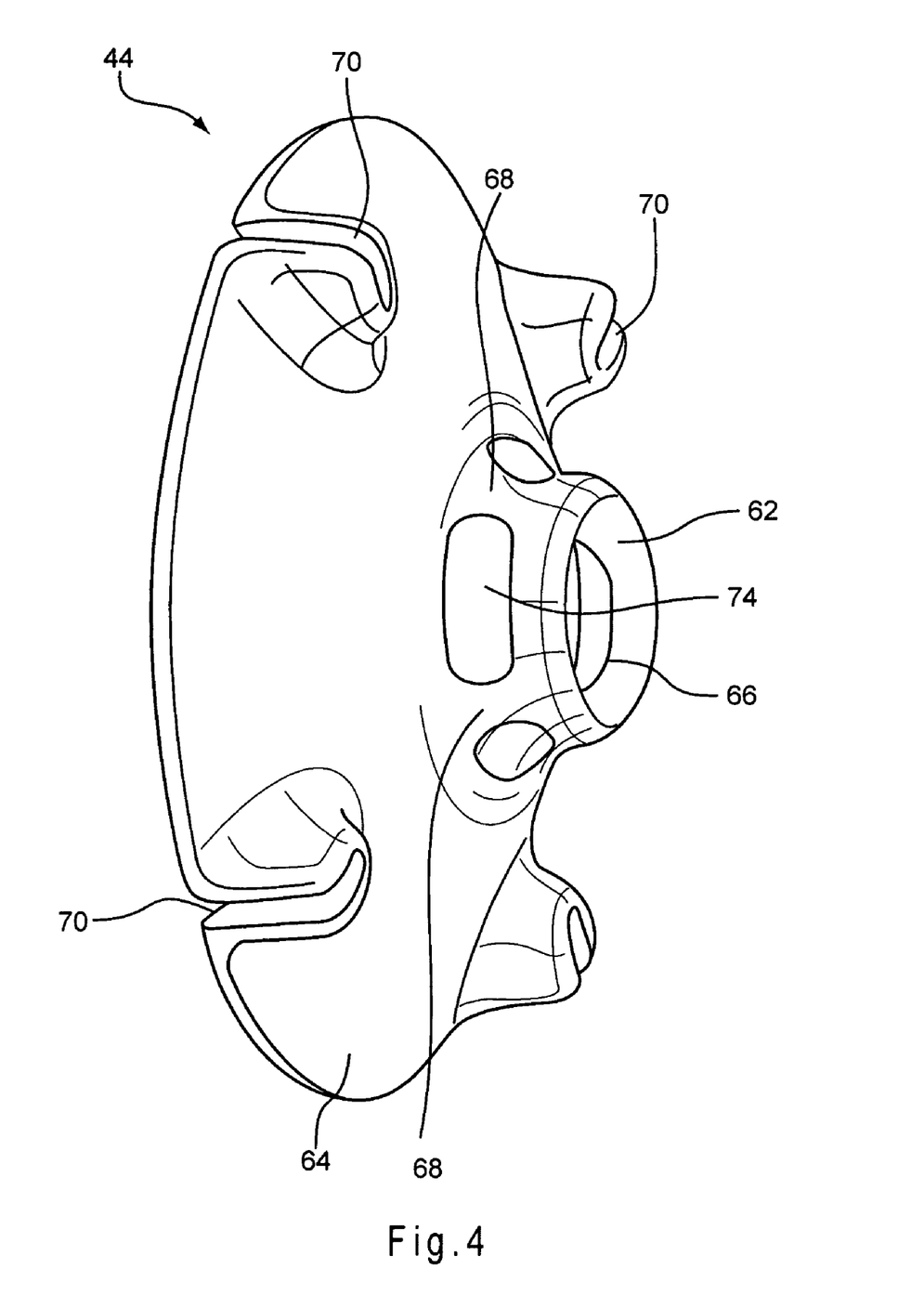
FIG. 4 is a perspective view of a baffle for use with the dispenser embodiment of FIGS. 1-3.
Figure 5:
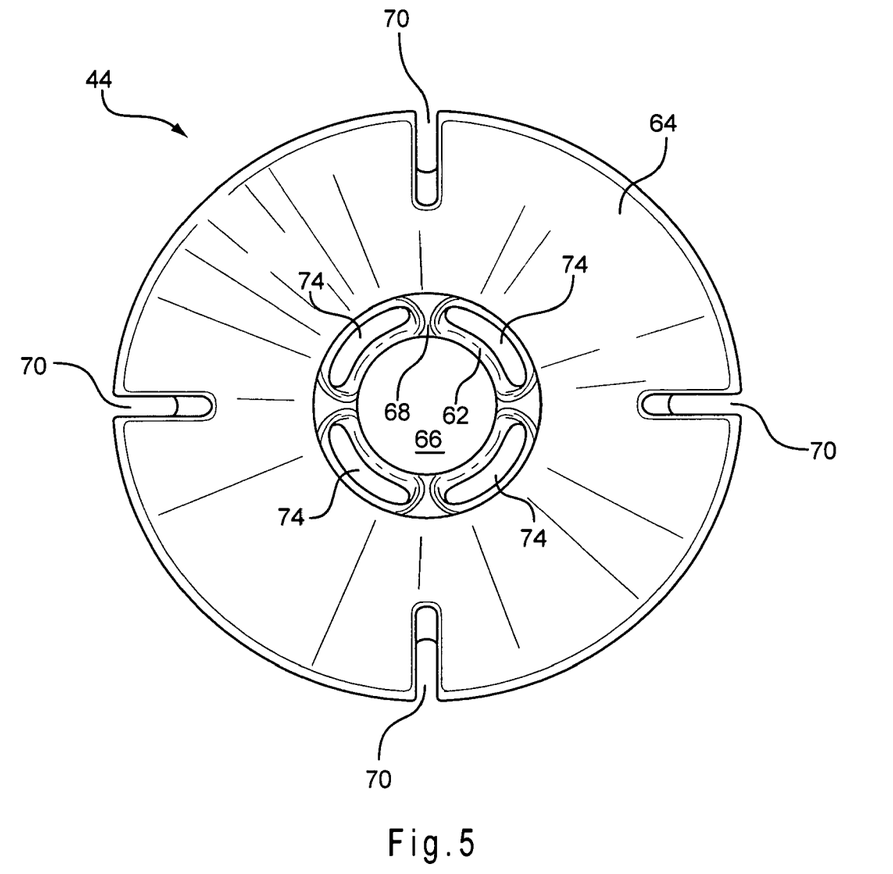
FIG. 5 is a plan view of the baffle shown in FIG. 4.

In FIGS. 4 and 5, a preferred structure of baffle 44 is illustrated. Preferably, baffle 44 is constructed from a rigid material such as metal or plastic but may be flexible. In FIG. 4, baffle 44 is shown in perspective view with baffle ring 62 positioned below baffle plate 64 and suspended within a baffle opening 66 by ribs 68. Baffle opening 66 includes the open area in the center of baffle ring 62, with flow openings 74 positioned around baffle ring 62 between ribs 68. A series of slots 70 are formed in the baffle plate 64 for engagement with the reservoir ribs 42 (see FIG. 2). Opening 58 (FIG. 3) is provided for direction of granular material 46 from metering cup 38 through the space between baffle plate 64 and angled surface 36. Material is thus free to flow around the outside of angled surface 36 to passageway 52 (see FIG. 3). A series of flow openings 74 are defined between baffle support ribs 68. Flow openings 74 define the exhaust for metering cup 38 into open area 58. In other words, granular material 46 that initially flows outside of baffle ring 62 will fall through openings 74 and into open area 58.

FIG. 5 shows a top plan view of baffle plate 64 with baffle opening 66 in the center thereof. Opening 66 has a larger diameter than the diameter of baffle ring 62. As shown, baffle ring 62 outside dimension is positioned radially inward of the inside dimension of flow openings 74. Flow openings 74 are also positioned inward of the inside diameter of the metering cup 38 and provide access from the cup to open area 58. (See FIGS. 3 and 6.)

Figure 6:
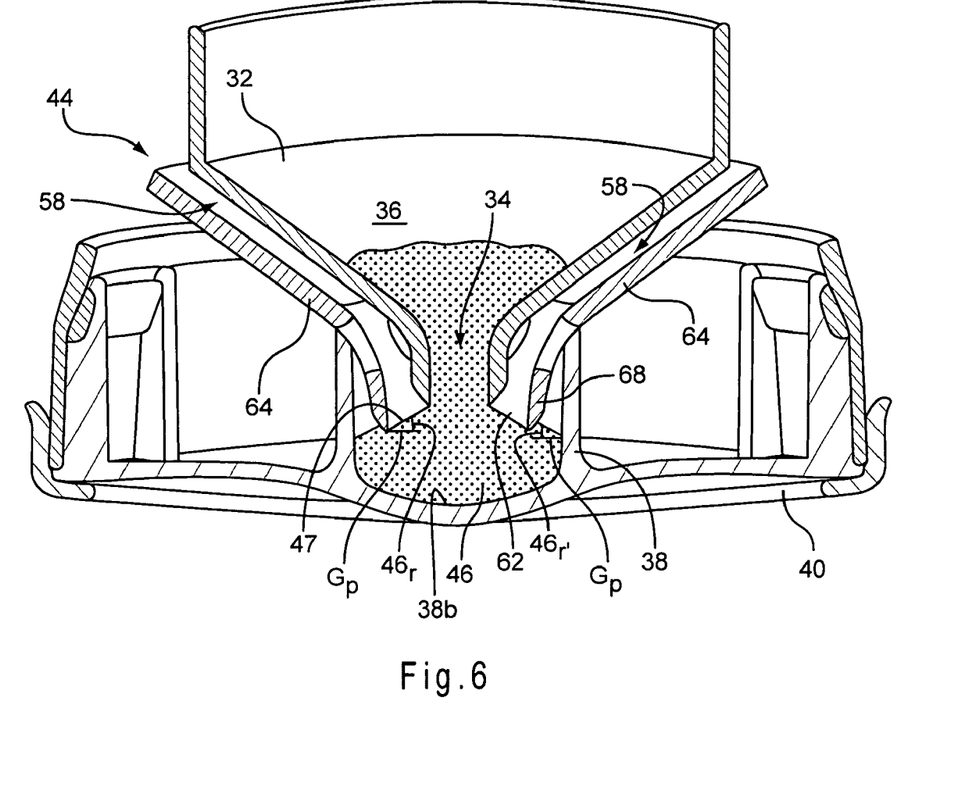
FIG. 6 is a partial cross sectional view of the baffle and metering cup portions of the dispenser of FIGS. 1-5.

In FIG. 6, dispenser 10 is in its first or loading orientation whereby granular material 46 is fed down angled surface 36 and through nozzle 34, filling metering cup 38 within its base and sidewall structure (material has been removed from within surface 36 and reservoir 30 for clarity). When dispenser 10 is inverted to the discharge position (shown in FIG. 3), some granular material 46 falls from metering cup 38 back into reservoir 30 via nozzle 34. The remaining material 46 falls through the inside of baffle ring 62 and flow openings 74 into open area 58, for passage along the outside surface of cap 32 and into passageway 52 (and eventually through collector opening 26 to diffuser 22).

As shown in FIG. 6, the quantity of material 46 within the inner reservoir 30 actually rests against angled surface 36 of reservoir cap 32. Additional granular material 46 flows through nozzle 34 and comes to rest within metering cup 38. Granular material 46 forms an angle of repose 46r. Angle of repose 46r is the angle between the surface of the pile (i.e., the repose surface 47) and a horizontal ground plane, Gp. Repose surface 47 extends from the edge of nozzle 34 to the wall of metering cup 38. Baffle ring 62 is in contact with granular material 46 adjacent to repose surface 47. As shown, baffle ring 62 may project inwardly into material 46, such that the angle of repose 46r' outwardly of the baffle may be slightly different from the angle 46r of the portion of material 46 positioned inwardly of baffle ring 62.

Generally, baffle 44 serves to stabilize granular material 46 within metering cup 38. If baffle ring 62 is removed, it is possible for material 46 to shift laterally when dispenser 10 is vibrated, jarred sideways or otherwise agitated. Thus, without baffle 44, the vibration/movement of dispenser 10 can dramatically change the angle of repose. Because baffle ring 62 is positioned inwardly of the wall of metering cup 38, but radially outwardly and axially below the nozzle, baffle 44 serves to fix the position of material 46 within cup 38. Therefore, baffle ring 62 maintains a more constant angle of repose, even if container 10 is jostled. Movement of material 46 within cup 38 is restricted by baffle ring 62 so any such movement will not significantly affect the amount of material 46 within cup 38. Thus, material 46 is more stable, will spread more evenly and dispenser 10 will not over dispense material. Upon inversion of dispenser 10 to the discharge position, the charge of material 46 will flow out of metering cup 38, through baffle opening 66, both inwardly of baffle ring 62 and through openings 74 positioned between baffle ring 62 and metering cup 38, and through open area 58. Open area 58, between reservoir cap 32 and baffle plate 64, directs the charge of material 46 into passageway 52.

The volume of material 46 in metering cup 38 is dependent upon the relationship between the position of nozzle 34 and bottom surface 38b of metering cup 38, as well as the internal diameter of cup 38. Thus, for a larger spacing between nozzle 34 and bottom surface 38b of metering cup 38, a larger charge of granular material 46 will be provided. (In addition, the type of material will vary the angle of repose 46r, 46r' within metering cup 38.)

An adjustable metering cup is discussed in commonly assigned U.S. Pat. No. 7,143,909, which is herein incorporated by reference. FIG. 7 shows an adjustable metering cup 38' for use with the present invention. As shown in FIG. 7, an adjustment means 80 varies the relative axial position of the nozzle 34 and the base 38b' of metering cup 38'. Metering cup 38' includes threads 82 disposed along the exterior of metering cup 38' and the lid 18' forms a threaded aperture for engaging cup threads 82. Threads 82 are substantially orthogonal to the material fill direction, e.g., the longitudinal axis of nozzle 34, such that metering cup 38' may translate axially toward or away from nozzle 34. Accordingly, the axial spacing from nozzle 34 to base 38b' of metering cup 38' is changed to vary the volume. Preferably, threads 82 are relatively coarse such that one full rotation (i.e., 360 degree) of metering cup 38' effects a meaningful change in the control volume. The volume of material 46 in cup 38' fills to a position of contact with baffle ring 62 to define a stabilizing angle of repose (as discussed above). This stabilizing effect is created by the relative position between baffle ring 62 and cup 38'.

In summary, the dispenser is capable of accurately delivering a controlled volume or quantity of granular material. The dispenser employs a simple, inexpensive mechanism for quickly and accurately measuring a quantity of granular material to be dispensed. The baffle within the metering cup stabilizes the material accumulation so that vibrations or movement of the dispenser do not materially alter the measured volume. The baffle is preferably positioned within the metering cup and is spaced radially inward thereof. The baffle preferably contacts the material in the cup, adjacent the upper surface of the material. Again, the contact between the baffle and the charge of material limits the effect of vibration or movement on the charge and thus serves to stabilize the measured quantity.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A method of dispensing a controlled quantity of a granular material from a dispenser composed of a container assembly having an outer enclosure and an inner reservoir containing granular material, said enclosure having an opening for the outflow of material, said enclosure and reservoir defining a passageway therebetween, said inner reservoir having a reservoir opening for the outflow of material from the reservoir and a metering cup disposed at one end of the enclosure and having an open end opposing said reservoir opening and a baffle including a generally annular baffle ring positioned within the metering cup, comprising:
    positioning the container assembly in a first orientation to direct a controlled quantity of material from the reservoir through the reservoir opening and into the metering cup;
    stabilizing the quantity of material directed into the cup by contacting the material with the baffle ring; and
    positioning the container assembly in a second orientation to deliver the controlled quantity of material from the metering cup to the passageway and to direct the material through the passageway and out the enclosure opening.

2. The method of claim 1, wherein the inner reservoir comprises a separate container that is removable from the container assembly, further comprising:
    removing the separate container from the container assembly when the separate container is at least partially empty; and
    replacing the at least partially empty separate container with a separate container that is at least partially filled with a charge of the granular material comprising at least the controlled quantity of granular material.

3. The method of claim 1, wherein the metering cup comprises a base and a sidewall structure, further comprising:
    adjusting an axial spacing of the nozzle and baffle from the base.

4. The method of claim 1, wherein said metering cup defines an internal geometry, further comprising:
    accumulating said granular material in the metering cup to define a repose surface inclined at a repose angle relative to a ground plane, the controlled quantity of material being defined by said metering cup geometry and said repose angle, and
    engaging the material adjacent the repose surface with the baffle ring when the controlled quantity is filled within the metering cup.

5. The method of claim 1, wherein the relative position of the baffle and inner reservoir define an open area in communication with the passageway, further comprising:
    directing the controlled quantity of granular material from the metering cup through the open area and into the passageway.

6. The method of claim 3, further comprising:
    providing the enclosure and the metering cup with corresponding threads;
    rotatably fixing the metering cup to the enclosure by engaging the corresponding threads and rotating the metering cup relative to the enclosure; and
    adjusting the axial spacing between the metering cup and the nozzle by rotating the metering cup relative to the enclosure.

7. The method of claim 1, further comprising providing the baffle ring in a generally coaxial disposition relative to the nozzle and the metering cup.

8. The method of claim 1, wherein positioning the container assembly in the second orientation comprises inverting the container assembly positioned in the first orientation about a generally horizontal axis.

9. A method of dispensing a controlled quantity of granular material from a dispenser composed of a container assembly defining an enclosed volume, a diffuser disposed at one end of the container assembly for spreading granular material dispensed from an opening within the assembly, an inner reservoir retaining granular material within the container assembly, a passageway defined within the assembly for directing material to said opening within the assembly, a metering cup disposed at one end of the container assembly adjacent a nozzle in the reservoir, the metering cup defining a controlled volume for granular material transferred from the reservoir through the nozzle and a baffle having a generally annular baffle ring spaced radially outward of the nozzle and radially inward of the metering cup, comprising:
    positioning the container assembly in a first orientation to direct a controlled quantity of material from the reservoir through the nozzle and into the metering cup;
    engaging the quantity of material in the metering cup with the baffle ring; and
    positioning the container assembly in a second orientation to deliver the controlled quantity of material from the metering cup through the passageway and to direct the material through the passageway, out said opening within the assembly, and through said diffuser to spread the controlled quantity of material.

10. The method of claim 9, wherein positioning the container assembly in the second orientation comprises inverting the container assembly positioned in the first orientation about a generally horizontal axis.

11. The method of claim 9, further comprising:
    providing the baffle ring spaced axially below the nozzle and positioned within the metering cup.

12. The method of claim 9, further comprising:
    providing at least one opening in the circumference of the baffle ring in communication with the passageway, and
    directing at least a portion of the controlled quantity of material from the metering cup to a location radially outward of and adjacent said baffle opening, through the baffle opening in a radially inward direction, and into the passageway.

13. The method of claim 9, further comprising:
providing the baffle with an angled baffle plate extending radially outward from the metering cup.

14. The method of claim 13, further comprising:
providing an outer surface of the inner reservoir positioned substantially parallel to the baffle plate, and
directing at least a portion of the controlled quantity of material through a space between the outer surface of the inner reservoir and the baffle plate and into the passageway.

15. The method of claim 9, further comprising:
providing the baffle ring disposed generally coaxially with the nozzle and with the metering cup.

16. A method of dispensing a measured quantity of granular material from a dispenser composed of a container assembly having a passageway in communication with an opening for the outflow of granular material, an inner reservoir containing granular material, the inner reservoir positioned within the container assembly and having an opening for the outflow of granular material, a metering cup coupled to the container assembly and positioned opposite the reservoir opening, the metering cup in communication with the reservoir opening for receiving a measured quantity of material from the reservoir and in communication with the passageway for discharging the measured quantity of material and a baffle comprising a generally annular baffle ring positioned within the metering cup, the baffle ring spaced axially from the reservoir opening and radially inward of the metering cup, comprising:
positioning the container assembly in a first orientation to direct a measured quantity of material from the reservoir through the reservoir opening and into the metering cup;
contacting the measured quantity of material received within the metering cup with the baffle ring; and
positioning the container assembly in a second orientation to deliver the measured quantity of material from the metering cup through the passageway and to direct the measured quantity of material through the passageway and out the assembly opening.

17. The method of claim 16, further comprising providing the baffle ring disposed generally coaxially with the reservoir opening and with the metering cup.

18. The method of claim 16, wherein positioning the container assembly in the second orientation comprises inverting the container assembly positioned in the first orientation about a generally horizontal axis.

19. A method of dispensing a controlled quantity of granular material from a dispenser composed of a container assembly having an outer enclosure and an inner reservoir containing the granular material, said enclosure having an opening for the outflow of material, said enclosure and reservoir defining a passageway therebetween, said inner reservoir defining a nozzle for the outflow of material, a metering cup disposed at one end of the enclosure having an open end opposing said nozzle, the metering cup in communication with the passageway and baffle means positioned within the metering cup, comprising:
positioning the container assembly in a first orientation to direct said granular material from the reservoir through the nozzle and into the metering cup;
accumulating said granular material in said metering cup to define a repose angle of the granular material until a controlled quantity of material defined by said repose angle and an internal geometry of the metering cup is filled within the metering cup;
engaging the filled controlled quantity of material adjacent the repose angle with said baffle means to stabilize the filled controlled quantity of material; and
positioning the container assembly in a second orientation to deliver the controlled quantity of material from the metering cup through the passageway and to direct the controlled quantity of material through the passageway and out the enclosure opening.

20. The method of claim 19, wherein positioning the container assembly in the second orientation comprises inverting the container assembly positioned in the first orientation about a generally horizontal axis.

21. A method of dispensing a controlled quantity of granular material from a dispenser composed of a container assembly having an outer enclosure and an inner reservoir containing the granular material, said enclosure having an opening for the outflow of material, said enclosure and reservoir defining a passageway therebetween, said inner reservoir defining a nozzle for the outflow of material, a metering cup disposed at one end of the enclosure and having an open end opposing said nozzle and baffle means positioned within the metering cup, wherein the relative position of the baffle means and inner reservoir define an open area in communication with the passageway, comprising:
positioning the container assembly in a first orientation to direct a controlled quantity of material from the reservoir through the nozzle and into the metering cup;
engaging the controlled quantity of material in the metering cup with the baffle means to stabilize the controlled quantity of material in the metering cup; and
positioning the container assembly in a second orientation to deliver the controlled quantity of material from the metering cup through the open area, into the passageway, through the passageway, and out the enclosure opening.

22. The method according to claim 21, wherein positioning the container assembly in the second orientation comprises inverting the container assembly positioned in the first orientation about a generally horizontal axis.

23. A method of dispensing a controlled quantity of granular material from a dispenser composed of a container assembly defining an enclosed volume, a diffuser disposed at one end of the container assembly for spreading granular material dispensed from an opening within the assembly, an inner reservoir retaining granular material within the container assembly and having a nozzle for the outflow of granular material within the reservoir, a passageway defined within the assembly for directing material to said opening within the assembly, a metering cup disposed at one end of the container assembly adjacent the nozzle in the reservoir, the metering cup defining a controlled volume for granular material transferred from the reservoir through the nozzle, the controlled volume in communication with said passageway and a baffle spaced radially outward of the nozzle and radially inward of the metering cup, the baffle positioned adjacent the controlled volume, and the baffle comprising at least one opening in the circumference of the baffle in communication with the passageway, comprising:
positioning the container assembly in a first orientation to direct the granular material from the reservoir through the nozzle and into the metering cup and to fill the controlled volume with a controlled quantity of the granular material;

engaging the controlled quantity of material in the metering cup with the baffle; and positioning the container assembly in a second orientation to deliver the controlled quantity of material from the metering cup through the passageway;

directing at least a portion of the controlled quantity of material from the metering cup to a location radially outward of and adjacent said baffle opening, through the baffle opening in a radially inward direction, and into the passageway; directing the controlled quantity of material through the passageway and out said opening within the assembly; and directing the controlled quantity of material through the diffuser to spread the controlled quantity of material.

24. The method of claim 23, wherein positioning the container assembly in the second orientation comprises inverting the container assembly positioned in the first orientation about a generally horizontal axis.

* * * * *